US008799268B2

(12) United States Patent
Branca

(10) Patent No.: US 8,799,268 B2
(45) Date of Patent: Aug. 5, 2014

(54) CONSOLIDATING TAGS

(75) Inventor: Salvatore Branca, Roma (IT)

(73) Assignee: International Business Machines Corporation, Armonk, NY (US)

( * ) Notice: Subject to any disclaimer, the term of this patent is extended or adjusted under 35 U.S.C. 154(b) by 928 days.

(21) Appl. No.: 12/485,693

(22) Filed: Jun. 16, 2009

(65) Prior Publication Data
US 2010/0153392 A1 Jun. 17, 2010

(30) Foreign Application Priority Data

Dec. 17, 2008 (EP) .................................... 08171895

(51) Int. Cl.
G06F 7/00 (2006.01)
G06F 17/30 (2006.01)

(52) U.S. Cl.
USPC ................................ 707/713; 707/760; 704/4

(58) Field of Classification Search
CPC .................... G06F 17/30864; G06F 17/30389; G06F 17/30873; G06F 17/30395; G06F 17/30967; G06F 17/30023; G06F 17/3089; G06F 17/28; G06F 17/20; G06F 17/21; G06F 17/271; G06F 17/2735
See application file for complete search history.

(56) References Cited

U.S. PATENT DOCUMENTS

| 5,526,477 A * | 6/1996 | McConnell et al. ........... 345/467 |
| 5,745,600 A * | 4/1998 | Chen et al. ..................... 382/218 |
| 5,751,906 A * | 5/1998 | Silverman ..................... 704/260 |
| 6,502,114 B1 * | 12/2002 | Forcier .......................... 715/273 |
| 6,665,642 B2 * | 12/2003 | Kanevsky et al. ............. 704/260 |
| 6,751,600 B1 | 6/2004 | Wolin |
| 7,313,822 B2 * | 12/2007 | Ben-Itzhak ...................... 726/24 |
| 7,729,904 B2 * | 6/2010 | Bennett .......................... 704/215 |
| 7,792,870 B2 * | 9/2010 | Field et al. ..................... 707/802 |
| 7,840,589 B1 * | 11/2010 | Holt et al. ...................... 707/769 |
| 7,890,526 B1 * | 2/2011 | Brewer et al. ................. 707/767 |
| 2003/0233224 A1 | 12/2003 | Marchisio et al. |
| 2005/0114370 A1 * | 5/2005 | Lewak et al. .................. 707/100 |
| 2006/0080314 A1 * | 4/2006 | Hubert et al. ..................... 707/5 |
| 2006/0149720 A1 * | 7/2006 | Dehlinger ........................ 707/3 |
| 2007/0078832 A1 | 4/2007 | Ott et al. |
| 2007/0185702 A1 * | 8/2007 | Harney et al. ..................... 704/4 |
| 2007/0203704 A1 * | 8/2007 | Ozkaragoz et al. ........... 704/260 |

FOREIGN PATENT DOCUMENTS

KR  20020017330 A  3/2002

OTHER PUBLICATIONS

EP 0661670A2; Date of Publication, May 7, 1995.*
Carlson, Peter; "Apache Lucene-Query Parser Syntax"; 2006; 7 pages; The Apache Software Foundation; USA http://lucene.apache.org/java/2_3_1/queryparsersyntax.html#Proximity%20Searches.
Thielen, Daniele; "Tag-Based Content Aggregation and Browsing"; 2007; Mobile Computing and Communication Alliance; Faculty of Sciences, Technology, and Communication; The University of Luxembourg; http://mocca.uni.lu/lectures/mics/theses/index.html.
"A Web Author's Guide to Search Engines: Part 2;" University of Essex; http://www.essex.ac.uk/wag/searchguide/search2.htm.

* cited by examiner

Primary Examiner — Daniel Kuddus
(74) Attorney, Agent, or Firm — D'Ambrosio & Menon, PLLC; Usha Menon

(57) ABSTRACT

Methods, systems, and computer program products for searching a resource associated with a tag. The method may include receiving a search request comprising a first tag for identifying the resources associated with the tag, replacing the tag of the search request with a tag in a standardized form and running a search query comprising the standardized tag to identify the resource associated with the standardized tag.

19 Claims, 3 Drawing Sheets

CONSOLIDATING TAGS

PRIORITY

This application is based on and claims the benefit of priority from European Patent 08171895.9, filed Dec. 17, 2008.

BACKGROUND

The main characteristic of many Web 2.0 applications is the degree of collaboration allowed between users. Such collaboration often comes from "tagging" methodologies. One user can "tag" a bookmark, a book, a file, or a blog entry using a tag and any other user can search through tags to retrieve all the entries with the same characteristic. This allows users to group information and to look at patterns in the clustering of the data to extract valuable information for analysis.

SUMMARY

Embodiments of the invention disclose associating a tag with an object in a web page. In one embodiment of the invention, a method for associating a tag with an object in a web page comprises receiving a first phrase to be associated with the object wherein the phrase comprises a first set of at least two words; identifying a first word and a second word in the first phrase wherein the first and second words belong to a first dictionary; identifying a second set comprising at least one character from the first phrase, wherein none of the identified characters belong to the identified first or said second words; modifying the second set by discarding a character from the second set if it corresponds to a first predefined character; generating a second phrase, comprising the first and second words, and a third word comprising each character of the modified second set wherein the first, second and third words are separated by a second predefined character; and associating the second phrase with the object so as to define the second phrase as a tag for the object.

Thus, the tag with which the object has been associated may be more general and in a more standardized form so that further requests for that tag or an equivalent tag may have a greater probability of hitting that object.

The method further comprises receiving a predefined synonymous word in response to a search request into a thesaurus for the first word; and replacing the first word in the second phrase by the predefined synonymous word while generating the second phrase. In one embodiment of the invention, the predefined synonymous word is arbitrarily selected. In another embodiment of the invention, the predefined synonymous word is selected based upon number of occurrences of the synonymous word in tag submissions. Thus, tags which have an equivalent meaning and which thus point to objects likely to be of interest to the same people may be regrouped into the same meta tag.

The method further comprises detecting a spelling error in the first word; and replacing the first word in the second phrase by a fourth word while generating the second phrase, the fourth word corresponding to the first word with corrected spelling. Therefore, typos may not hinder the identification of relevant resources.

The method further comprises detecting whether the first word is in plural form; and replacing the first word in the second phrase by a fifth word while generating the second phrase, the fifth word corresponding to the first word in singular form. The actual meaning of a word may be taken into account rather than its particular form.

The order of the characters in the second word is the same in the first phrase. Thus, new words may be taken into account and even added to the dictionary, with the possibility to define later synonyms for these new words.

The method of further comprises using the second phrase instead of the first phrase when searching for the object, the search being in response to a search request submitted by a user wherein the search request comprises the first phrase.

Implementations of the method discussed above may include a computer-implemented method, a system, or a computer program product. The details of one or more embodiments of the invention are set forth in the accompanying drawings and the description below. Other features of the invention will be apparent from the description and drawings, and from the claims.

DETAILED DESCRIPTION

Exemplary methods, systems, and computer program products for associating a tag with an object in a web page are described with reference to the accompanying drawings. The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
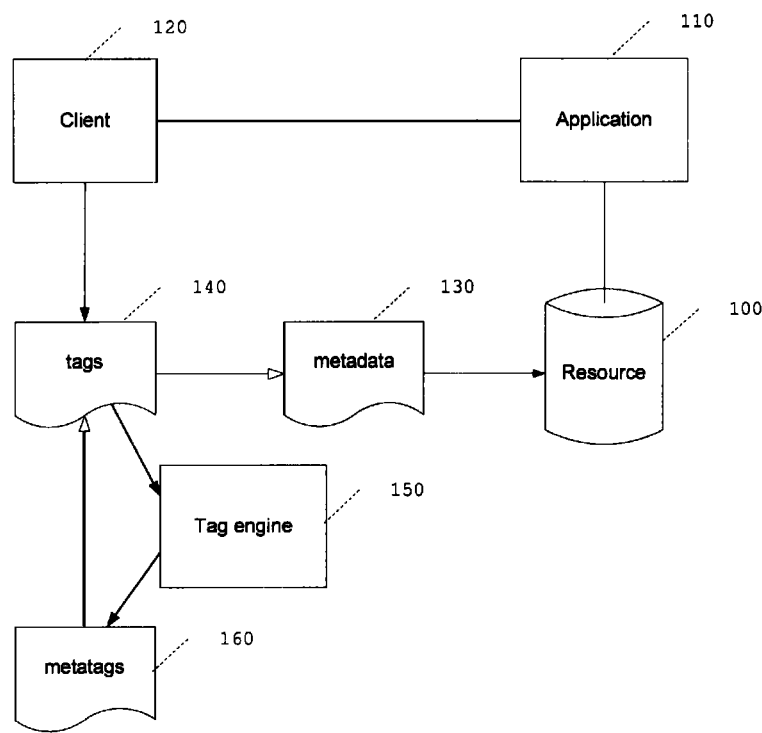
FIG. 1 is a schematic representation of a system in accordance with one embodiment of the invention.

FIG. 1 shows a system according to one embodiment of the present invention, comprising: a resource 100; an application 110; a client 120; some meta data 130 associated with the resource 100; tags 140 submitted by the client 120; a tag engine 150 for processing the tags 140; and meta tags 160 generated by the tag engine 140.

The application 110 manages access to the resource 100. The resource 100 can be further characterized by the meta data 130 associated with it. The meta data 130 provides background information associated with the resource, such as its title, its creation date, and its author. The tags 140 may be considered meta data 130 as they provide information on the content of the resource 100, such as its purpose. The client 120 may submit the tags 140. The tags 140 max comprise a complex association of several words and characters. Since multiple clients 120 can associate a tag with a resource 100, especially in a Web 2.0 environment, different clients 120 max tag a resource similarly, but use different forms for what would substantively be the same tag 140. In one embodiment of the invention, the tag engine 150 may collect these different forms and rationalize them into a standardized form called a meta tag 160.

Figure 2:
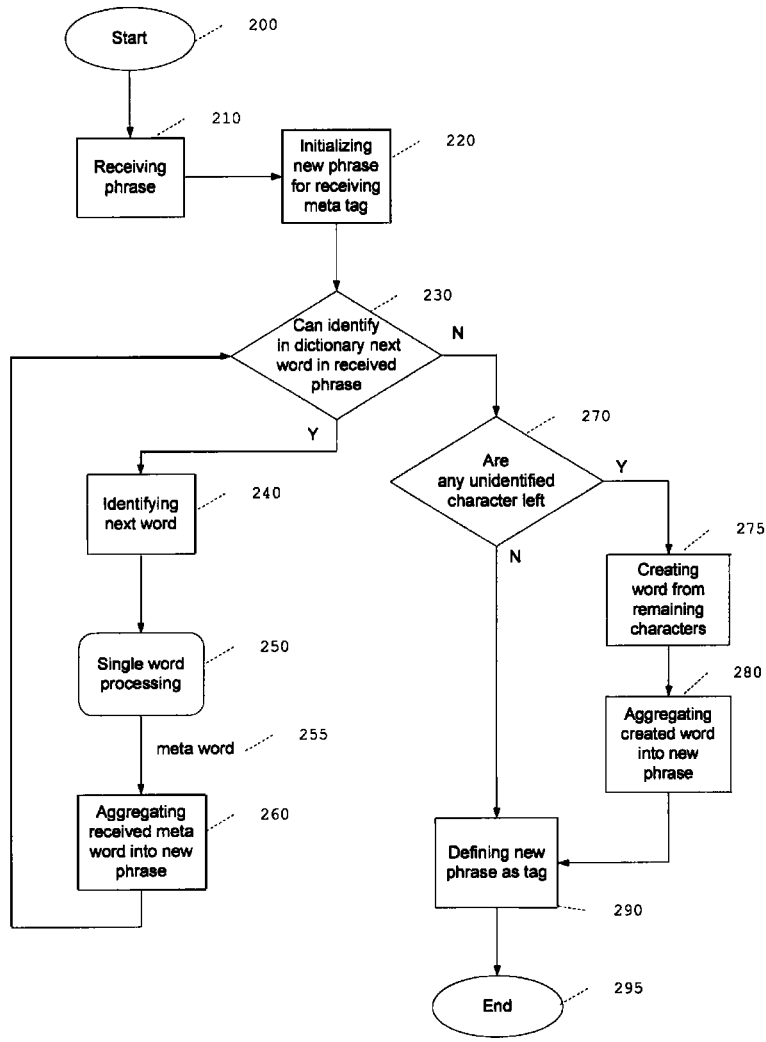
FIG. 2 is a flowchart showing a high-level process for creating a meta tag from a submitted tag according to an embodiment of the invention.

FIG. 2 shows a high-level process for creating a meta tag from a submitted tag, in accordance with another embodiment of the invention, comprising: a start activity 200; receiving a phrase 210; initializing a new phrase for receiving a meta tag 220; determining whether the system can identify in a dictionary a next word in the received phrase 230; if the system can identify in a dictionary a next word in the received phrase 230, identifying the next word 240, processing that word 250 so as to generate a meta word 255 from it, and aggregating the received meta word 255 into a new phrase 260; if the system cannot identify in a dictionary a next word in the received phrase 230, determining whether there are any unidentified characters left 270; if there are no unidentified characters left 270, defining the new phrase as a meta tag 290 and ending the process 295; and if there are any unidentified characters left 270, creating a word from these unidentified characters 275, aggregating this created word into the new phrase 280, defining the new phrase as a meta tag 290 and ending the process 295.

Figure 4:
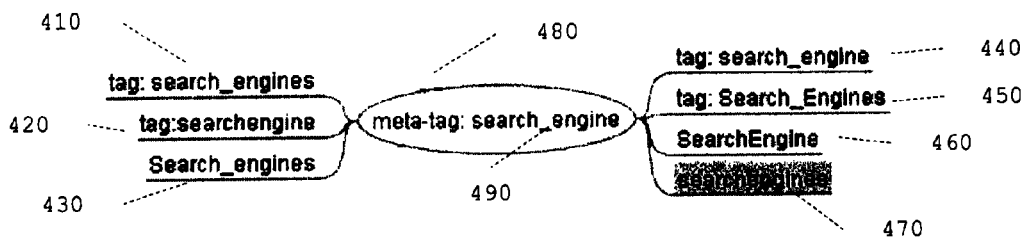
FIG. 4 illustrates a meta tag associated with different possible submitted tags according to an embodiment of the invention.

The client-submitted lag may contain several words, or a phrase, that the user 120 finds suitable for describing the resource 100. FIG. 4 describes examples of phrase submissions in more detail. After receiving the phrase 210, the system initializes a new phrase variable that will receive the constructed meta tag 220.

There are several ways to determine whether the phrase contains a word that belongs to a dictionary. Special characters not including letters of the alphabet can separate different words. Analysis is performed to determine whether the words separated by these characters belong to a predefined dictionary or not. A user may submit a phrase comprising at least two words not separated by any character. The phrase submitted by the user may contain a typographical error where the user intended to start the phrase with a different first letter, for example. Word recognition in that scenario may involve starting with the first submitted letter, and attempting to construct a word with the following letters until a word belonging to a predefined dictionary is recognized. Variants of these words max be explored to detect any plural form ending with the letter "s" and past tense form ending with an "ed." If no words are identifiable in this manner, the tag engine 150 may look for a best match instead of looking for an exact match. Looking for a best match involves constructing a tree of possible matches and selecting the most probable word with respect to user intent. Such analyses may take care of typographical errors in the words even if they affect the first letter in the word. The same analyses are repeatable for the second word. The difficult part would be to detect when the second word begins and when the first word ends. The same technique used to identify the highest probable word submitted by the user may be used to identify the most probable combination of two words. For example, if the first word is in its plural form, it may not be clear whether the "s" is the last letter in the first word or the first letter in the second word. This problem may be solved by constructing a tree with two branches, each branch corresponding to a possible combination, and determining which branch contains the combination most likely intended by the user.

Figure 3:
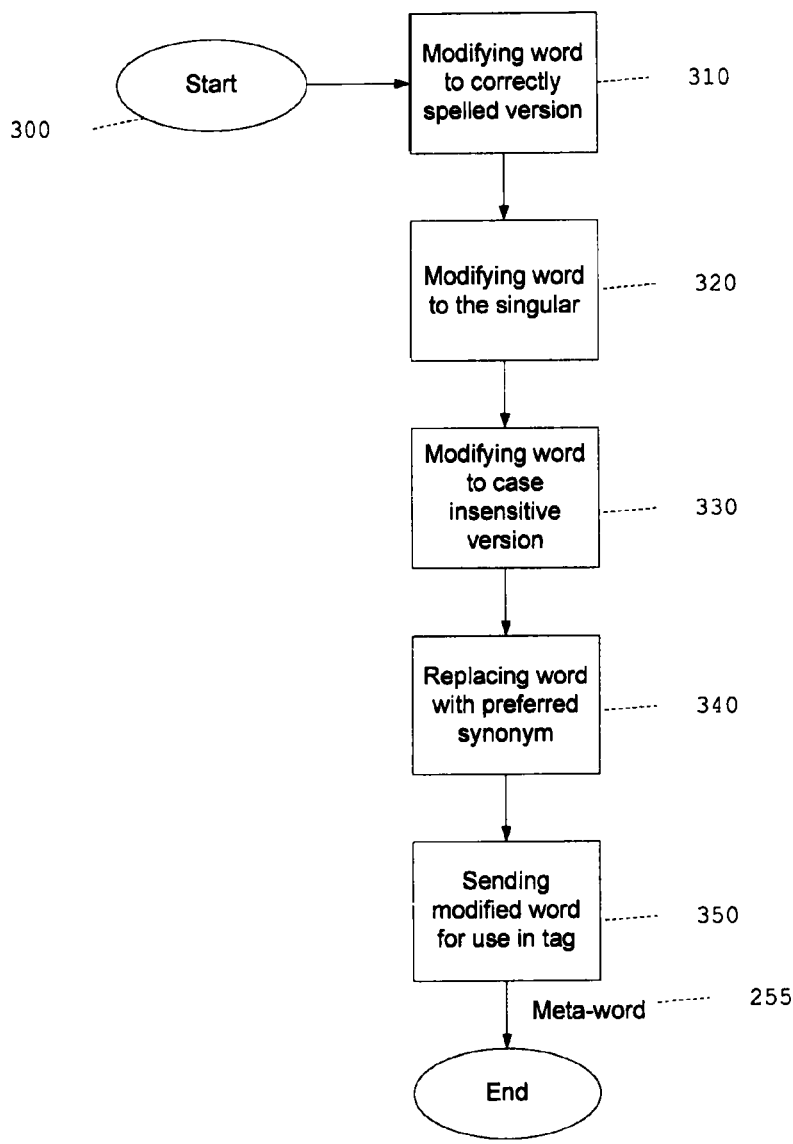
FIG. 3 is a flowchart showing a high-level process for generating a meta word from a single word in accordance with one embodiment of the invention.

Once a word has been identified, the next step is to isolate that word 240 and to run it through the single word processing activity 250. FIG. 3 describes the single word processing activity 250 in more detail. The single word processing activity 250 generates a meta word 255 constructed from the identified word in the previous step 240. This meta word may be aggregated into the new phrase previously initialized 220. This new phrase acts as a container for the unique meta tag that is constructed from the submitted tag.

In an embodiment of the invention, the meta words 255 aggregated in the new phrase may be separated by a predefined character, such as a space or an underscore.

When it is not possible to identify any words in the phrase belonging to a predefined dictionary, the tag engine checks whether there are any unidentified characters remaining in the submitted phrase 270. These characters may correspond to a word that is not recognized by the system. The characters may construct a new word, which is a common occurrence in the Internet. One embodiment of the present invention discards any remaining characters belonging to a predefined group. These may be special characters such as stars or asterisks. The tag engine 150 attempts to create a word from the remaining characters 275. The new word may be aggregated into the new phrase 280. The new phrase is defined 290 as a meta tag 160 for the selected resource 100.

FIG. 3 shows a high-level process for generating a meta word from a single word according to one embodiment of the present invention, comprising: a start activity 300; modifying the word to a correctly spelled version 310; modifying the word to the singular form 320; modifying the word to a case insensitive version (completely lowercase, for example) 330; replacing the word with a preferred synonym 340; and sending the modified word for use in a tag 350, the modified word being a meta word 255.

The choice of the preferred synonym could be arbitrary or it could be based upon the number of occurrences of the word in tag submissions. For example, if A and B are two synonyms, and A appears 10 times in a first tag, and B appears 20 times in a second tag, the first and second tags being equivalent and differing only in that they respectively contain A and B, then the tag engine 150 may decide that B should be the preferred synonym.

FIG. 4 shows a meta tag 480 "search_engine" associated with different submitted tags according to one embodiment of the present invention, comprising: a submitted tag wherein the second word is in the plural form 410, 470; a submitted tag wherein the two words are concatenated and not separated by any special character 420; a submitted tag wherein some letters are in capitalized and others not 430, 450, 460; a submitted tag 440 corresponding to the actual meta tag.

In this example, the meta tag has two words separated by an underscore 490 as a special character. This representation may identify the relevant resources 100 in response to a user request. Hence, the relevant resources may be found not only when the user selects the correct form for the meta tag, but also when he submits a tag 140 in a less suitable form, such as the concatenated form in the plural 470. The system may still be able to find the relevant resources 100 using the meta tag 160 as a pivot term for the search.

In another embodiment, the method may include receiving a search request comprising a first tag for identifying the resources associated with the tag, replacing the tag of the search request with a tag in a standardized form, running a search query comprising the standardized tag, to identify the resource associated with the standardized tag.

In yet another embodiment, a method for consolidating, in a tag engine, a tag into a meta-tag, comprises: receiving a first tag as entered by a user; isolating each word comprised in the first tag; determining whether one of the each isolated word does not belong to a pre-defined vocabulary; and if one word has been so determined, using the first tag for the meta-tag, and if no word has been so determined, concatenating in a predefined order the each isolated word into the meta-tag, where each word is separated by a predefined separator.

Embodiments of the invention can take the form of computer-implemented method, computer program product, a system, an entirely hardware embodiment, an entirely software embodiment or an embodiment containing both hardware and software elements. In one embodiment, the invention is implemented in software, which includes but is not limited to firmware, resident software, and microcode.

Another embodiment of the present invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories that provide temporary storage of at least some program code in order to reduce the number of times code is retrieved from bulk storage during execution.

Input/output or I/O devices (including, but not limited to, keyboards, displays, and pointing devices) can be coupled to the system either directly or through intervening I/O controllers.

Network adapters may also be coupled to the system to enable the data processing system to become coupled to other data processing systems or remote printers or storage devices through intervening private or public networks. Cable modems and ethernet cards are just a few of the currently available types of network adapters.

It should also be understood that the inventive concepts disclosed herein are capable of many modifications. To the extent such modifications fall within the scope of the appended claims and their equivalents, they are intended to be covered by this patent.

The invention claimed is:

1. A computer-implemented method for associating a meta tag with an object when searching for the object in a web page, the method comprising:
    receiving a first tag to be associated with the object, the first tag comprising at least two words;
    identifying a first word and a second word in the first tag;
    identifying a second set of one or more characters comprising at least one character from the first tag, the at least one character not forming part of the first word and not forming part of the second word;
    determining, in a system comprising a processor, whether the second set comprises one or more characters corresponding to a first predefined character, wherein the first predefined character comprises a space and an underscore;
    modifying the second set by discarding from the second set each of the one or more characters determined to correspond to the first predefined character;
    isolating at least the first word and the second word in the first tag;
    determining whether each of the isolated first and second words does not belong to a predefined dictionary, and wherein using the first tag as a meta tag for the object when at least one of the first word or the second word belongs to the predefined dictionary;
    concatenating the isolated first and second words, in a pre-defined order, into a second tag when neither the isolated first and second words belong to the predefined dictionary, wherein the isolated first and second words are separated by the first predefined character; and
    associating the concatenated second tag with the object to define the concatenated second tag as a meta tag for the object, wherein the meta tag is used as pivot term in identifying relevant resources in response to a search request.

2. The method of claim 1 further comprising:
    receiving a predefined synonymous word based on a search request for the first word provided to a thesaurus; and
    replacing the first word in the concatenated second tag with the predefined synonymous word while generating the concatenated second tag.

3. The method of claim 2, wherein the predefined synonymous word is arbitrarily selected.

4. The method of claim 2, wherein the predefined synonymous word is selected based upon a number of occurrences of the synonymous word in tag submissions.

5. The method of claim 1 further comprising:
    detecting a spelling error in the first word; and
    replacing the first word in the concatenated second tag by a fourth word while concatenating the second tag, the fourth word corresponding to the first word with spelling error corrected.

6. The method of claim 1 further comprising:
    determining whether the first word is in plural form; and
    converting the first word to a fifth word in singular form responsive to a determination that the first word is in plural form; and
    replacing the first word in the second tag with the fifth word while concatenating the second tag.

7. The method of claim 1 further comprising:
    generating a new search request from the search request comprising the first tag by replacing the first tag with the concatenated second tag; and
    searching for the object using the new search request.

8. A computer program product for associating a meta tag with an object when searching for the object in a web page comprising:
    a non-transitory computer-readable medium comprising:
    computer program instructions for receiving a first tag to be associated with the object, the first tag comprising at least two words;
    computer program instructions for identifying a first word and a second word in the first tag;
    computer program instructions for identifying a second set of one or more characters comprising at least one character from the first tag, the at least one character not forming part of the first word and not forming part of the second word;
    computer program instructions for determining whether the second set comprises one or more characters corresponding to a first predefined character, wherein the first predefined character comprises a space and an underscore;

computer program instructions for modifying the second set by discarding from the second set each of the one or more characters determined to correspond to the first predefined character;

computer program instructions for isolating at least the first word and the second word in the first tag;

computer program instructions for determining whether each of the isolated first and second words does not belong to a predefined dictionary, and wherein using the first tag as a meta tag for the object when at least one of the first word or the second word belongs to the predefined dictionary;

computer program instructions for concatenating the isolated first and second words, in a pre-defined order, into a second tag when neither the isolated first and second words belong to the predefined dictionary, wherein the isolated first and second words are separated by the first predefined character; and computer program instructions for associating the concatenated second tag with the object to define the concatenated second tag as a meta tag for the object, wherein the meta tag is used as a pivot term in identifying relevant resources in response to a search request.

9. The computer program product of claim 8 further comprising:
computer program instructions for receiving a predefined synonymous word based on a search request for the first word provided to a thesaurus; and
computer program instructions for replacing the first word in the concatenated second tag with the predefined synonymous word while generating the second tag.

10. The computer program product of claim 9, further comprising computer program instructions for arbitrarily selecting the predefined synonymous word.

11. The computer program product of claim 9, further comprising computer program instructions for selecting the predefined synonymous word based upon a number of occurrences of the synonymous word in tag submissions.

12. The computer program product of claim 8 further comprising:
computer program instructions for detecting a spelling error in the first word; and
computer program instructions for replacing the first word in the concatenated second tag by a fourth word while generating the concatenated second tag, the fourth word corresponding to the first word with the spelling error corrected.

13. The computer program product of claim 8 further comprising:
computer program instructions for determining whether the first word is in plural form;
computer program instructions for converting the first word to a fifth word in singular form responsive to a determination that the first word is in plural form; and
computer program instructions for replacing the first word in the concatenated second tag with the fifth word while concatenating the second tag.

14. The computer program product of claim 8 further comprising:
computer program instructions for generating a new search request from the search request comprising the first tag by replacing the first tag with the concatenated second tag; and computer program instructions for searching for the object using the new search request.

15. A computer-implemented system for associating a meta tag with an object when searching for the object in a web page, the system comprising:
a processor; and
a computer memory operatively coupled to the processor, the computer memory having disposed therein:
computer program instructions for receiving a first tag to be associated with the object, the first tag comprising at least two words;
computer program instructions for identifying a first word and a second word in the first tag;
computer program instructions for identifying a second set of one or more characters comprising at least one character from the first tag, the at least one character not forming part of the first word and not forming part of the second word;
computer program instructions for determining whether the second set comprises one or more characters corresponding to the first predefined character, wherein the predefined character comprises a space and an underscore;
computer program instructions for modifying the second set by discarding each character of the one or more characters from the second set determined to correspond to the first predefined character;
computer program instructions for isolating at least the first word and the second word in the first tag;
computer program instructions for determining whether each of the isolated first and second words does not belong to a predefined dictionary, and wherein using the first tag as a meta tag for the object when at least one of the first word or the second word belongs to the predefined dictionary;
computer program instructions for concatenating the isolated first and second words, in a pre-defined order, into a second tag when neither the isolated first and second words belong to the predefined dictionary, wherein the isolated first and second words are separated by the first predefined character; and
computer program instructions for associating the concatenated second tag with the object to define the concatenated second tag as a meta tag for the object, wherein the meta tag is used as a pivot term in identifying relevant resources in response to a search request.

16. The system of claim 15 further comprising:
computer program instructions for receiving a predefined synonymous word based on a search request for the first word provided to a thesaurus; and
computer program instructions for replacing the first word in the concatenated second tag with the predefined synonymous word while concatenating the second tag.

17. The system of claim 15 further comprising:
computer program instructions for detecting a spelling error in the first word; and
computer program instructions for replacing the first word in the second tag by a fourth word while concatenating the second tag, the fourth word corresponding to the first word with the spelling error corrected.

18. The system of claim 15 further comprising:
computer program instructions for determining whether the first word is in plural form;
computer program instructions for converting the first word to a fifth word in singular form responsive to a determination that the first word is in plural form; and computer program instructions for replacing the first word in the concatenated second tag with the fifth word while concatenating the second tag.

19. The system of claim 15 further comprising:

computer program instructions for generating a new search request from the search request comprising the first tag by replacing the first tag with the concatenated second tag; and computer program instructions for searching for the object using the new search request.

* * * * *